United States Patent
Sloan et al.

(10) Patent No.: US 9,862,849 B1
(45) Date of Patent: Jan. 9, 2018

(54) ENERGY CURABLE FOAM INHIBITION INK

(71) Applicant: Electronics for Imaging, Inc., Fremont, CA (US)

(72) Inventors: Donald A. Sloan, Parkville, MO (US); Paul Andrew Edwards, Kalamazoo, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/400,024

(22) Filed: Jan. 6, 2017

Related U.S. Application Data

(60) Provisional application No. 62/413,279, filed on Oct. 26, 2016.

(51) Int. Cl.
| | |
|---|---|
| *C09D 11/30* | (2014.01) |
| *B41J 2/01* | (2006.01) |
| *C09D 11/38* | (2014.01) |
| *C09D 11/101* | (2014.01) |
| *C09D 11/102* | (2014.01) |
| *C09D 11/107* | (2014.01) |

(52) U.S. Cl.
CPC ............... *C09D 11/38* (2013.01); *B41J 2/01* (2013.01); *C09D 11/101* (2013.01); *C09D 11/102* (2013.01); *C09D 11/107* (2013.01)

(58) Field of Classification Search
CPC ....... C09D 11/101; C09D 11/34; C09D 11/30; C09D 11/00; B41J 2/01
See application file for complete search history.

(56) References Cited

U.S. PATENT DOCUMENTS

2010/0256255 A1* 10/2010 Stevens .................... C08F 2/48
522/182

* cited by examiner

*Primary Examiner* — Thinh H Nguyen
(74) *Attorney, Agent, or Firm* — Michael A. Glenn; Perkins Coie LLP

(57) ABSTRACT

An energy curable foam inhibition ink composition comprises an oligomer component consisting of 5-15% by weight of the ink composition, a photoinitiator component consisting of 5-15% by weight of ink composition, a monofunctional monomer component consisting of 20-40% by weight of ink composition, a difunctional monomer component consisting of 10-20% by weight of the ink composition, and an inhibitor additive consisting of 5-20% of the ink composition.

5 Claims, 1 Drawing Sheet

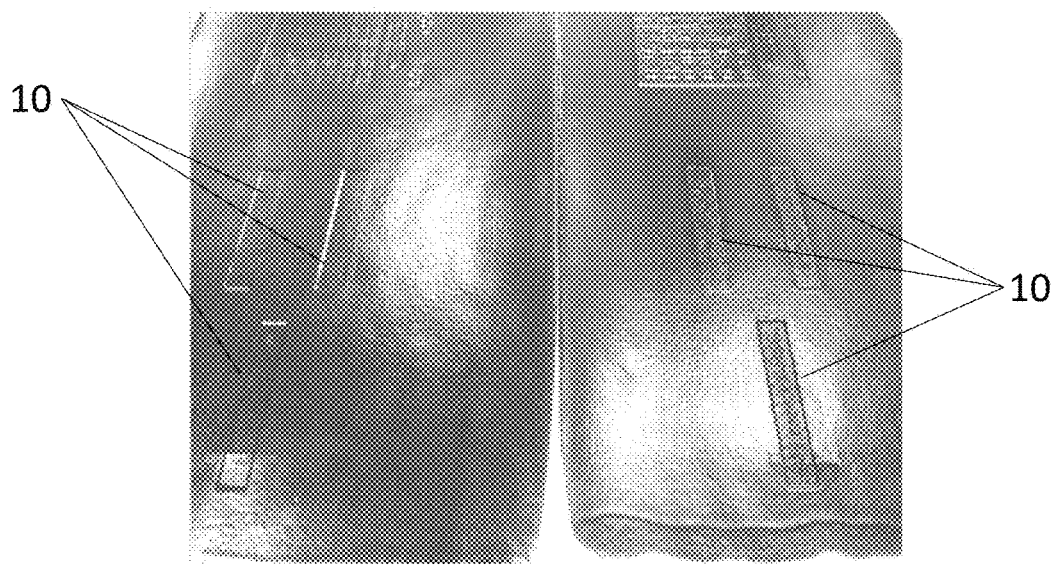

ENERGY CURABLE FOAM INHIBITION INK

CROSS REFERENCE TO RELATED APPLICATIONS

This application claims priority to U.S. provisional patent application Ser. No. 62/413,279, filed Oct. 26, 2016, which application is incorporated herein in its entirety by this reference thereto.

FIELD

Various of the disclosed embodiments concern the printing of vinyl flooring, wallpaper coverings, faux leather, and any other substrate decorated with a foam layer. More specifically, embodiments of the invention concern the ink jet printing of cushion vinyl products, where an inhibitor is used to create decorative patterns in the cushion (foam) layer.

BACKGROUND

Historically, vinyl flooring, wall coverings, and other products, such as artificial leather, have been decorated via analog printing methods, such as gravure. Cushion flooring and wall coverings are a popular product and patterns within the cushion are created by the printing of a chemical inhibitor which stops the formation of the bubbles which creates the cushion effect.

Due to the width and length of the vinyl flooring rolls and the speed of the process, as well as the investment in hundreds of huge gravure cylinders, the industry has moved relatively slowly towards digital printing. In recent years, the reliability and throughput of wide format UV curing printers has increased significantly and the economics for printing vinyl flooring and wall coverings has become much more interesting. For example, with certain UV ink formulations it has been possible to change the printing process from analog to digital and get good print quality and robustness of construction, i.e. adhesive strength between the print and the other layers.

SUMMARY

Embodiments of invention comprise an energy curable ink jet fluid which acts in the same manner as an analog inhibitor coating with regards to inhibiting the formation of a foam and hence creating a 3D decorative effect on the vinyl flooring or other applications.

Embodiments of the invention allow the inhibitor to be applied via a UV curable ink by the ink jet printer in scanning or single pass modes or operation.

Therefore, embodiments of invention allow the digital 3D patterning of cushion vinyl products, such as vinyl flooring, vinyl wallpaper, and artificial leather.

There are a number of chemical inhibitors well known to create an effective impact on reducing or eliminating the creation of the foam. However, embodiments of invention relate to the formulation of an energy curable ink jet fluid formulation that contains sufficient chemical inhibitor to provide a competitive 3D structure effect, as well as having all of the other important characteristics in terms of functionality in the product and functionality as a jettable fluid.

In particular, embodiment so the invention comprise an energy curable foam inhibition ink composition comprises an oligomer component consisting of 5-15% by weight of the ink composition, a photoinitiator component consisting of 5-15% by weight of ink composition, a monofunctional monomer component consisting of 20-40% by weight of ink composition, a difunctional monomer component consisting of 10-20% by weight of the ink composition, and an inhibitor additive consisting of 5-20% of the ink composition.

DRAWINGS

FIG. 1 shows examples of the impact of the herein disclosed inhibitor in terms of creating defined structure.

DESCRIPTION

Although it has been possible to print the vinyl products with UV ink jet inks, a functional UV ink acting as an inhibitor has not been available or developed before. Thus, although many of the benefits of ink jet printing have been realized, such as ability to create any number of images of unlimited size, reduction in stock, and elimination of the massive and expensive gravure cylinders, it has not been possible to create the patterns in the cushion vinyl that are an important part of the analog portfolio.

Embodiments of invention comprise an energy curable ink jet fluid which acts in the same manner as an analog inhibitor coating with regards to inhibiting the formation of a foam and hence creating a 3D decorative effect on the vinyl flooring or other applications.

Embodiments of the invention allow the inhibitor to be applied via a UV curable ink by the ink jet printer in scanning or single pass modes or operation. Therefore, embodiments of invention allow the digital 3D patterning of cushion vinyl products, such as vinyl flooring, vinyl wallpaper, and artificial leather.

There are a number of chemical inhibitors well known to create an effective impact on reducing or eliminating the creation of the foam. However, embodiments of invention relate to the formulation of an energy curable ink jet fluid formulation that contains sufficient chemical inhibitor to provide a competitive 3D structure effect, as well as having all of the other important characteristics in terms of functionality in the product and functionality as a jettable fluid.

Such key parameters include, for example:

Cure speed sufficiently fast to allow for production printing speeds.

The cure speed requirement depends upon printing method, as well as the curing system. For example, the highest speed printers today for this application are scanning printers, such as the EFI HSr Pro, EFI GS5500 LXr Pro, and the EFI Quantum LXr 3/5. The inhibition ink must print at the same speed as the other inks in these printers, which are capable of printing many hundreds of sq./feet per hour.

Adhesion to both sides of the construction.

There are many construction options which could be applied, depending upon application. However, in its simplest form the ink and the inhibitor must adhere strongly to two layers. First is the foam layer and second is a base layer. The inhibitor and color ink must adhere well before and after the foaming process. With regards to vinyl flooring, for example, the ink is printed onto a wear layer, which is typically a vinyl layer, but which could comprise other polymer types. The inhibitor could be printed below the colors or above the colors of the flooring. The half of the structure described above can then be rolled up and stored before the final process. The next part of the structure is to add the foaming layer. The layer is coated onto the image and inhibitor and then heat treated to create the foam. The inhibitor reduces the foaming in the vicinity of where it is applied. The ink and inhibitor layer must adhere well to the foamed layer.

Clear layer with thermal stability to avoid yellowing upon processing of flooring construction.

The construction of the cushion vinyl flooring, wall coverings, etc. is characterized by the fact that they are printed digitally. Thus, the color of the image created after all of the processing is completed must accurately recreate the color in the original file. Considering that constructions reach temperatures of above 200° C. for multiple minutes, it can be difficult for a UV clear formulation and inhibitor to avoid yellowing. The formulation herein disclosed is specifically designed to minimize yellowing, such that it does not impact the image when viewed with the naked eye.

Low surface tack such that, when rolled up during processing, the ink does not stick to back of film.

Often the manufacturing process is such that there are multiple steps involved. In one part of the process the printed inhibitor and ink is rolled up and comes in contact with the substrate under pressure for a significant amount of time. There is the possibility of ink sticking (blocking) to the back of the film. It is a challenge to formulate a clear ink with a high concentration of inhibitor and avoid blocking; however, the herein disclosed formulations have achieved the balance.

Must be within jettable parameters of print heads.

The inks herein disclosed are formulated to function in different print heads, such as those used by EFI. Key parameters include viscosity at the jetting temperature (45° C.) that is typically within a viscosity range between 4 and 15 cP with a surface tension between 23 and 28 dynes.

Must pass storage stability tests and work in conditions in printer.

Inks must pass storage condition tests which check for stability. Inks are typically aged for five weeks at 60° C., 16 weeks at 45° C., and 15 months at ambient temperature. Key tests include viscosity and filtration tests. This procedure is used to ensure there are no oversized particles or re-agglomeration of the inks used. The viscosity is checked with a 00 spindle using a Brookfield viscometer at 45° F. The viscosity must be within 10.0-12.50 centipoise for it to be a pass. This is critical, otherwise jetting issues could arise.

Ink Formulation

Table 1 below outlines an overall ink formulation in accordance with the invention. The values refer to percentage by weight.

TABLE 1

Inhibitor Ink Formulation Ranges

| CONSTITUENT | % WEIGHT |
| --- | --- |
| Oligomer | 5 to 15% |
| Photoinitiators | 5 to 15% |
| Monofunctional monomers | 20 to 40% |
| Difunctional monomers | 10 to 20% |
| Surfactant additive | 0 to 3% |
| Amine functional additives | 2 to 8% |
| Inhibitor additive | 5 to 20% |

Oligomer

The oligomer used in the ink is very flexible and also offers good adhesion and a non-wrinkle surface once it is heated due to the low shrinkage of the ink film. In one embodiment, the inks comprise an oligomer component with no more than 15% by weight of ink composition. Note that while embodiments of the invention (see below) have focused on one chemical for use in the ink, many other chemicals have a similar effect including, for example, Irgamet 39, BASF (tolutriazole derivative), and Irgamet 30, 42, BTZ, TTZ, TT50.

Photoinitiator

The ink compositions comprise a photoinitiator component. In the radiation curing process, the photoinitiator component initiates the curing in response to incident radiation. The amount of a photoinitiator component in the ink compositions is 5-15% by weight. The selection of the type of the photoinitiator component in the ink compositions is generally dependent on the wavelength of curing radiation and the colorant employed in the ink compositions. It is preferred that the peak absorption wavelengths of selected photoinitiator vary with the range of wavelength of curing radiation to effectively use radiation energy, especially using ultraviolet light as radiation.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2 phenylacetophenone, 2-hydroxy-2-methylpropionphenone, Diphenyl (2,4,6-trimethylbenzoyl) phosphine oxide, bis(2,6 dimethoxy-benzoyl)-2,4, 6 trimethyl phenyl phosphine oxide, 2-methyl-1-1 [4-(methylthio) phenyl]-2-morpholino-propan 1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6 trimethylbenzophenone, isopropyl thioxanthone. Suitable blends of photoinitiators commercially available include, but are not limited to, those under the designations of Darocur 4265, Irgacure 2022, Irgacure 2100 from Ciba® Specialty Chemicals; and Esacure KT37, Esacure KT55, Esacure KTO-46 from Lamberti®).

The photoinitiator component can further comprise a co-initiator. The amount of co-initiator component is 0-15% by weight of the ink compositions, preferably 0-10% by weight of the ink compositions, more preferably 2-7% by weight of ink compositions. The co-initiator component is used to activate photoinitiators to initiate polymerization or is used to improve the surface curing of ink by mitigating oxygen inhibition to free radicals generated by photoinitiators. Examples of suitable co-initiators include, but are not limited to, those under the designations of CN386, CN384, and CN383 from Sartomer® and Ebecryl 7100 from Cytec® Surface Specialty.

Monofunctional Monomer

The monofunctional monomer type is very important because helps to minimize shrinkage in the ink film, provides better adhesion than multifunctional monomers, and helps to maintain lower viscosity.

Difunctional Monomer

The difunctional monomer helps to create less surface tack due to the high glass transition temperature (TG).

Surfactant Additive/Amine Functional Additive

The surfactants and amine functional additives maintain tackiness without using amine additives.

Inhibitor Additive

The inhibitor additive inhibits the formation of a foam and hence creates a 3D decorative effect on the substrate.

EXAMPLES

The following examples provide various embodiments of the invention. However, these examples are not intended to limit the scope of the invention. The values refer to percentage by weight.

Ink Formulation: Example 1

| CONSTITUENT | % WEIGHT |
| --- | --- |
| E 20109 URETHANE SOLUTION (1:1 THFA/CN9009) | 23.00 |
| GENORAD 20 STABILIZER | 1.00 |
| M-222 DPGDA | 15.10 |
| IBOA | 24.20 |
| MIRAMER M - 1130 | 12.00 |
| FS-3100 SURFACTANT | 0.20 |
| TEGO GLIDE 450 SURFACTANT | 0.50 |
| TPO | 10.00 |
| IRGACURE 184 | 3.00 |
| ESACURE ONE | 1.00 |
| IRGAMET P-39 INHIBITOR ADDITIVE | 10.00 |

Ink Formulation: Example 2

| CONSTITUENT | % WEIGHT |
| --- | --- |
| E 20109 URETHANE SOLUTION (1:1 THFA/CN9009) | 19.00 |
| ALLNEX LEO RESIN 10551 AMINE ACRYLATE | 4.00 |
| GENORAD 16 STABILIZER | 1.00 |
| M-222 DPGDA | 18.00 |
| IBOA | 20.00 |
| MIRAMER M - 1130 | 13.30 |
| FS-3100 SURFACTANT | 0.20 |
| TEGO GLIDE 450 SURFACTANT | 0.50 |
| TPO | 10.00 |
| IRGACURE 184 | 3.00 |
| ESACURE ONE | 1.00 |
| IRGAMET P-39 INHIBITOR ADDITIVE | 10.00 |

Ink Formulation: Example 3

| CONSTITUENT | % WEIGHT |
| --- | --- |
| E 20109 URETHANE SOLUTION (1:1 THFA/CN9009) | 17.00 |
| EBECRYL 85 AMINE MODIFIED POLYETHER ACRYLATE | 4.00 |
| GENORAD 16 STABILIZER | 1.00 |
| M-222 DPGDA | 19.00 |
| IBOA | 21.00 |
| MIRAMER M - 1130 | 13.30 |
| FS-3100 SURFACTANT | 0.20 |
| TEGO GLIDE 450 SURFACTANT | 0.50 |
| TPO | 10.00 |
| IRGACURE 184 | 3.00 |
| ESACURE ONE | 1.00 |
| IRGAMET P-39 INHIBITOR ADDITIVE | 10.00 |

Ink Formulation: Example 4

| CONSTITUENT | % WEIGHT |
| --- | --- |
| E 20109 URETHANE SOLUTION (1:1 THFA/CN9009) | 17.00 |
| EBECRYL 83 AMINE MODIFIED POLYESTER ACRYLATE | 4.00 |
| GENORAD 16 STABILIZER | 1.00 |
| M-222 DPGDA | 19.00 |
| IBOA | 21.00 |
| MIRAMER M - 1130 | 13.30 |
| FS-3100 SURFACTANT | 0.20 |
| TEGO GLIDE 450 SURFACTANT | 0.50 |
| TPO | 10.00 |
| IRGACURE 184 | 3.00 |
| ESACURE ONE | 1.00 |
| IRGAMET P-39 INHIBITOR ADDITIVE | 10.00 |

Ink Formulation: Example 5

| CONSTITUENT | % WEIGHT |
| --- | --- |
| E 20109 URETHANE SOLUTION (1:1 THFA/CN9009) | 17.00 |
| EBECRYL 85 AMINE MODIFIED POLYETHER ACRYLATE | 4.00 |
| GENORAD 20 STABILIZER | 1.00 |
| M-222 DPGDA | 19.00 |
| IBOA | 21.00 |
| MIRAMER M - 1130 | 13.30 |
| FS-3100 SURFACTANT | 0.20 |
| TEGO GLIDE 450 SURFACTANT | 0.50 |
| TPO | 10.00 |
| IRGACURE 184 | 3.00 |
| ESACURE ONE | 1.00 |
| IRGAMET P-39 INHIBITOR ADDITIVE | 10.00 |

Ink Formulation: Example 6

| CONSTITUENT | % WEIGHT |
| --- | --- |
| SR 506 | 21.00 |
| MIRAMER M222 | 19.00 |
| MIRAMER M1130 | 14.70 |
| E20109 EURETHANE SOLUTION | 16.60 |
| EBECRYL 85 | 4.00 |
| GENORAD 16 | 1.00 |
| CAPSTONE FS-3100 | 0.20 |
| TEGOGLIDE 450 | 0.50 |
| GENOCURE TPO | 10.00 |
| ESACURE 1 | 3.00 |
| IRGAMET IRGAMET 39 | 10.00 |

Water-Based Ink

Embodiments of the invention also comprise water-based UV curable jettable formulations that have the stability and fluid characteristics required for good jettability. The water-based UV curable inks are based on acrylated polyurethane dispersions. Foam inhibitors such as benztriazol derivatives, as described herein, when added to the dispersions are sequestered in the lipophilic pocket of the micellular dispersion. The water based ink is then jetted, dried, and cured under UV or LED light.

Ink Formulation: Example 7

| CONSTITUENT | % WEIGHT |
|---|---|
| UCECOAT ® 7674, Acrylated polyurethane dispersion, Allnex | 50.00 |
| TPO-L (2,4,6-trimethylbenzoylphenyl phosphinate) | 3.00 |
| PnB (Propylene Glycol n-Butyl Ether) | 5.00 |
| Glycerol | 3.00 |
| BYK ® 348 (silicone surfactant) | 0.5 |
| IRGAMET P-39 INHIBITOR ADDITIVE | 10 |
| CN309 (Acrylated polymer, Sartomer) | 3 |
| Deionised water | 25.50 |

The ink compositions can be printed using any conventional ink jet printer. For example, both scanning and single pass type roll-to-roll printers could be used. However, embodiments of the invention could be applied to applications using flat bed or hybrid printer technology. Embodiments of the invention are applicable to both DOD (drop on demand) and CIJ (continuous ink jet) printing processes.

In one embodiment, the ink jet printer includes a component for radiation curing of the ink. This could include the use of Hg lamps, Ebeam lamps, LED lamps of different wavelengths, such as LED C, eximer lamps of different wavelengths, Ebeam curing, and other UV cure (UVC) processes. In another embodiment, the radiation curing component is a separate assembly. Non-limiting examples of suitable radiation sources for UV curing include high-pressure or low-pressure mercury vapor lamps, with or without doping, or electron beam sources. Their arrangement is known in principle and may be adapted to the circumstances of the substrate for printing and the process parameters.

FIG. 1 shows examples of the impact of the herein disclosed inhibitor in terms of creating defined structure. The images in FIG. 1 comprise a final construction test print, showing structure where the inhibitor was part of the printing process, i.e. the rectangular relief 10 in the surface of the structure.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An energy curable foam inhibition ink composition, comprising:
   an oligomer component consisting of 5-15% by weight of the ink composition;
   a photoinitiator component consisting of 5-15% by weight of ink composition;
   a monofunctional monomer component consisting of 20-40% by weight of ink composition;
   a difunctional monomer component consisting of 10-20% by weight of the ink composition; and
   an inhibitor additive consisting of 5-20% of the ink composition.

2. The ink composition of claim 1, further comprising:
   a surfactant additive consisting of 0-3% of the ink composition; and
   an amine functional additive consisting of 2-8% of the ink composition.

3. The ink composition of claim 1, further comprising:
   the ink composition having a jettable viscosity for inkjet printers between 4-15 cP at 45° Celsius.

4. The ink composition of claim 1, further comprising:
   the ink composition having a surface tension between 23-28 dynes.

5. A method of ink jet printing comprising:
   jetting from an ink jet printer an ink composition onto a substrate, the ink composition comprising:
   an oligomer component consisting of 5-15% by weight of the ink composition;
   a photoinitiator component consisting of 5-15% by weight of ink composition;
   a monofunctional monomer component consisting of 20-40% by weight of ink composition;
   a difunctional monomer component consisting of 10-20% by weight of the ink composition;
   a surfactant additive consisting of 0-3% of the ink composition;
   an amine functional additive consisting of 2-8% of the ink composition; and
   an inhibitor additive consisting of 5-20% of the ink composition.

* * * * *